L. R. Streeter,
Door Check.
No 41,451.         Patented Feb. 2, 1864.
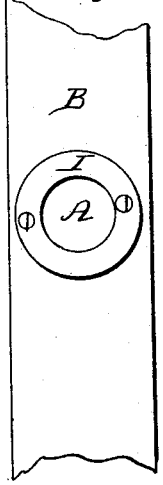
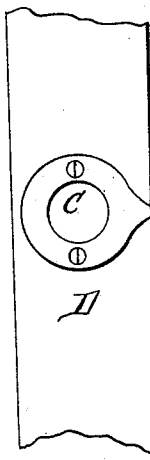
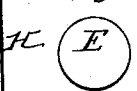
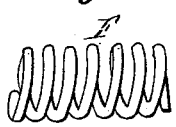
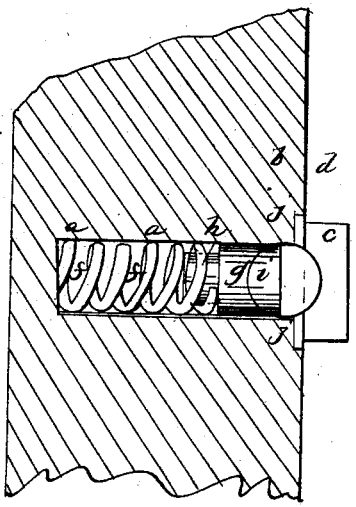
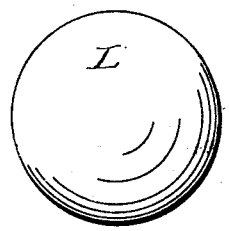
Witnesses:
Inventor:

UNITED STATES PATENT OFFICE.

LEANDER R. STREETER, OF CHELSEA, MASSACHUSETTS.

IMPROVEMENT IN FASTENING HINGED, SLIDING, OR OTHER BODIES.

Specification forming part of Letters Patent No. 41,451, dated February 2, 1864.

*To all whom it may concern:*

Be it known that I, LEANDER R. STREETER, of Chelsea, in the county of Suffolk and State of Massachusetts, have invented a new and improved mode of fastening hinged, sliding, or other bodies, usually secured by a latch, catch, button, or bolt; and I do hereby declare that the following is a full and exact description thereof, reference being had to the accompanying drawings, and to the letters of reference marked thereon.

The nature of my invention consists in fastening hinged, sliding, or other bodies, by a revolving ball confined in a socket and operated by a spring which is thus made self-acting and self-fastening.

To enable others skilled in the art to make and use my invention, I will proceed to describe its construction and operation.

I denominate it "the revolving self-acting ball-bolt." Although this principle or mode admits of other forms of application, yet the manner in which I apply it, wherever possible, is as follows:

Into the edge, say, of a door, B, I bore a hole, A, of a size sufficient to admit the spring $f$, the socket or cup $g$, with the shank $h$, and concave $i$, and the ball $e$, all confined in said hole by the plate $j$, through which the ball, being forced outward by the action of the spring, is allowed to protrude a portion of its diameter sufficient to enter the plate or socket C, inserted in and fastened to the door-frame D, and forming the catch.

The socket in the frame of the door may have a metallic lip, K, to receive the first pressure of the ball. Both the metallic ring and the frame-socket are beveled to the curve of the ball's diameter. When necessary, I employ two or more of the ball-bolts combined as above. To meet the "shrinkage," I make the socket in the door-frame of metal or other material, and sufficient thickness to be projected when required. To meet the "sagging," I make the aperture in the door-frame socket sufficiently elliptical to be always adjusted to receive the ball.

The principle of action of this new mode of fastening by a ball-bolt is that of a journal and a box, made self acting and adjusting by a spring. The handle or knob being stationary, all that is required to open a door is to pull upon the knob, or to raise a window, lift it, and vice versa, the ball revolving and sinking into its socket returning again the moment it is opposite the socket in the frame, thus becoming a very efficient and novel bolt.

In the drawings, Figure 1 is the face of a door; A, the socket; I, the metallic ring. Fig. 2 is the door-frame; D, the frame; C, the socket; K, the lip. Fig. 3 is the ball. Fig. 4 is the shoulder or cup; I, the concave face; H, the pintle. Fig. 5 is the spiral spring. Fig. 6 is the whole in position to work.

The small letters in Fig. 6 represent the capital letters in the other figures.

What I claim, and desire to secure by Letters Patent, is—

The fastening of hinged, sliding, or other bodies by means of a ball confined in a socket and operated by a spring, substantially as described.

LEANDER R. STREETER.

Witnesses:
  A. J. CASS,
  CHAS. A. F. SWAN.